Aug. 14, 1945.   G. B. ARNOLD   2,382,196
REFINING OF ROSIN
Filed Jan. 29, 1943
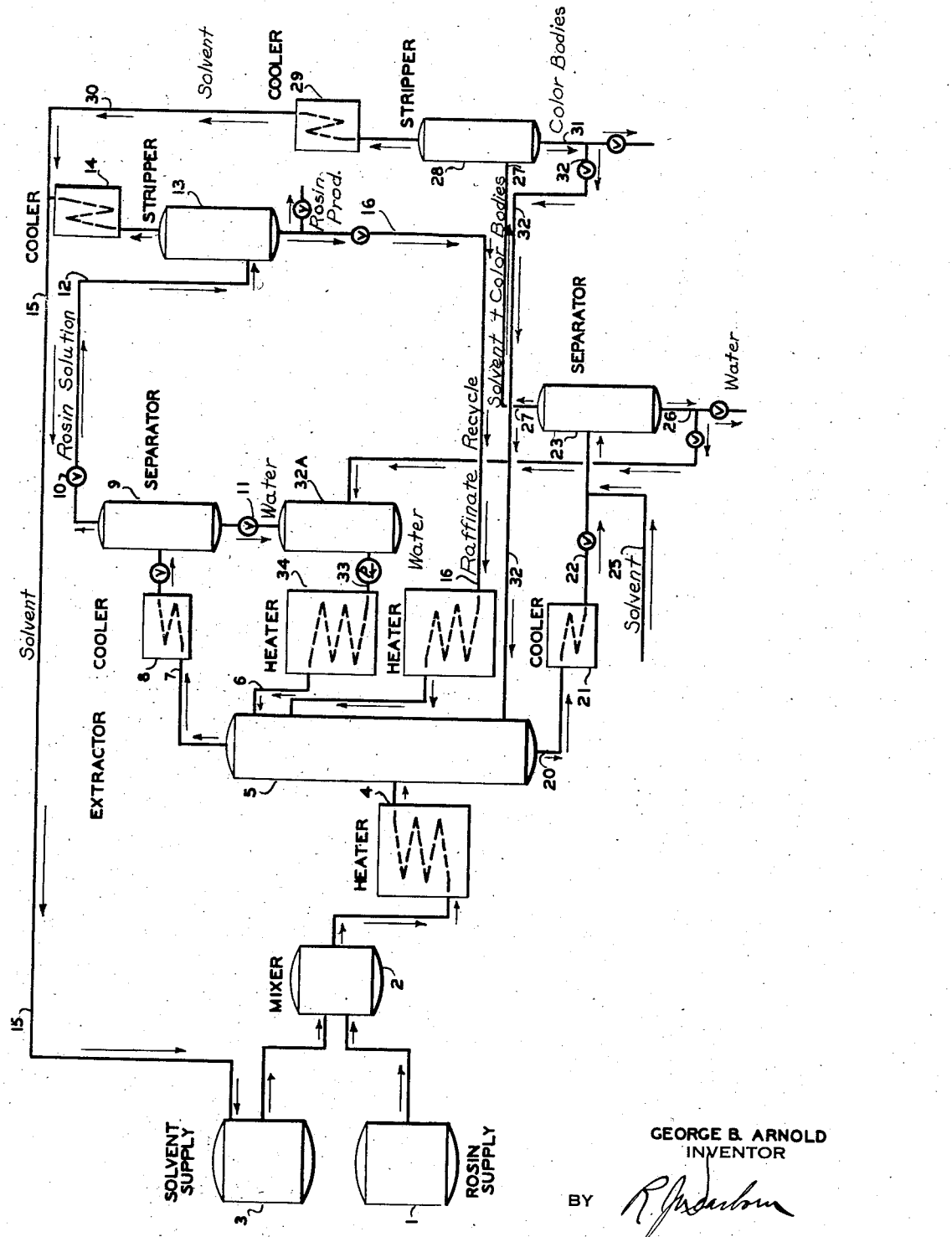
GEORGE B. ARNOLD
INVENTOR
BY
HIS ATTORNEY Patented Aug. 14, 1945

2,382,196

UNITED STATES PATENT OFFICE 2,382,196

REFINING OF ROSIN

George B. Arnold, Beacon, N. Y., assignor to The Texas Company, New York, N. Y., a corporation of Delaware Application January 29, 1943, Serial No. 474,007

2 Claims. (Cl. 260—111)

This invention relates to refining rosin and rosin oils for the purpose of removing unstable and color forming constituents therefrom.

The invention involves extracting rosin or rosin oil with a solvent comprising water under conditions of elevated temperature and pressure so as to selectively remove color forming bodies from the rosin.

Wood and gum rosins usually contain substantial amounts of objectionable coloring matter as well as unstable constituents which develop into objectionable color bodies in storage or in subsequent use.

The presence of such latent color forming bodies is undesired, particularly where the rosin is employed in the manufacture of high grade soaps and varnishes, etc.

Accordingly, the present invention has to do with an improved method for extracting color forming bodies from the rosin. Advantageously the water extraction is applied to a solution of the rosin in a suitable solvent having a specific gravity relatively lower than that of water.

In practicing the invention rosin oil is dissolved in a suitable solvent such as gasoline in the proportion of about 5 to 10 parts by volume of gasoline to 1 part of rosin oil. This solution is then subjected to contact with a substantial quantity of water at a temperature in the range about 200 to 700° F. and preferably at about 300° F. while under pressure sufficient to maintain the mixture in the liquid phase. Under these conditions color forming bodies are dissolved in the water and the resulting extract mixture of water and color forming bodies can be separated from the rosin solution. The resulting extract mixture and the rosin solution may be separately subjected to cooling to a temperature below 200° F. so as to cause separation of water therefrom.

Thereafter the solvent hydrocarbon can be stripped from the rosin and recovered for re-use.

In order to describe the invention in more detail reference will now be made to the accompanying drawing comprising a flow diagram illustrating one mode of practicing the invention.

Referring to the drawing rosin oil from a tank 1 is conducted to a mixing tank 2. A solvent such as gasoline is likewise drawn from a tank 3 to the mixer 2.

The solvent and rosin are introduced in proportion of about 6 or 7 parts of solvent to 1 part of rosin and solution of the rosin in the solvent is effected at a temperature in the range about 60 to 125° F.

The resulting solution is drawn off through a heating coil or heat exchanger 4 wherein it is raised to a temperature of about 300 to 400° F.

The heated solution is then introduced to an extraction tower 5 advantageously packed with suitable inert packing material adapted to facilitate contact with the water solvent.

A stream of water is continuously introduced to the upper portion of the extractor through a pipe 6 and to which reference will be made later.

The water introduced at a temperature in the range 300 to 400° F. descends over the packing material within the tower countercurrently to the rising body of rosin solution.

The extractor is maintained under sufficient pressure to keep the constituents of the mixture undergoing treatment in the liquid phase or at least substantially so.

Water is introduced to the top of the tower in an amount ranging from about 1 to 4 volumes per volume of solvent free rosin oil passing through the extractor.

The extracted rosin oil solution is drawn off in a stream continuously from the top of the tower through a pipe 7. It is cooled during passage through a cooler or exchanger 8 after which it is discharged into a separator 9 which may be maintained under substantially the same pressure as that prevailing within the extractor 5, the pressure being controlled by the valves 10 and 11. On the other hand the separator may be maintained at a lower pressure as, for example, substantially atmospheric pressure, if desired.

The rosin solution entering the separator 9 is at a temperature of about 70 to 100° F. at which separation into phases occurs, the upper phase comprising rosin solution while the lower phase comprises water. The amount of water so obtained is relatively small.

The two phases are separately withdrawn from the separator 9. Thus, the rosin solution is conducted through a pipe 12 to a stripper 13 wherein the solvent is stripped from the rosin oil, the stripped solvent being removed through a cooler 14 communicating with a pipe 15 by which means solvent may be returned to the tank 3.

If desired raffinate recycle may be used to give still better color removal. In such case a portion of the rosin from stripper 13 could be recycled through pipe 16 to the upper part of extractor 5.

The extract phase accumulating in the bottom portion of the extractor 5 which phase comprises the main body of water containing color forming bodies, and a minor amount of rosin dissolved therein is continuously withdrawn through a pipe 20 and cooler 21. From the cooler 21 it is conducted through a pipe 22 to a separator 23.

In the separator 23 the mixture of color forming bodies and a small amount of rosin and water is subjected to contact with a solvent such as gasoline which is substantially immiscible with water. The contact is made under conditions such that the gasoline dissolves the color forming bodies which were removed in the water so that the water substantially free from the color forming constituents may be discharged from the system. The color bodies, after removal of the gasoline, may be discarded or disposed of otherwise.

As indicated in the drawing the solvent is introduced through a pipe 25 which communicates with the previously mentioned pipe 22. In this way the solvent is brought into intimate contact with the cooled mixture of water and color forming bodies as the mixture passes through the pipe 22 into the separator 23 which may thus comprise a separating vessel. In such case phase separation occurs within the separator 23, the lower phase consisting essentially of water which can be discharged through a pipe 26 while the upper phase comprises color forming bodies dissolved in the hydrocarbon solvent. This upper phase is continuously drawn off through a pipe 27 to a stripper 28. In the stripper 28 the solvent is stripped from the color bodies and the stripped solvent is passed through a cooler 29 and a pipe 30 which communicates with the previously mentioned pipe 15 through which the recovered solvent is returned to the storage tank.

The color bodies free from solvent may be discharged from the stripper through a pipe 31.

A portion of the cooled extract phase from stripper 28 is thus recycled through a branch pipe 32 to the extractor 5. The lower portion of the extractor comprises a rectiflow section, the function of which is to realize more effective separation between color forming bodies and rosin oil within the reactor.

It is contemplated that separation between water and color bodies in the separator 23 may be effected merely by subjecting the extract mixture to settling at reduced temperature in the absence of a solvent such as gasoline. In such case extract recycle material would, if used, be the separated color bodies.

As indicated the water discharged from the separator 9 and also from the separator 23 may be returned to a tank 32A to form the source of supply for water used in the extractor 5. In such case the water is conducted from the tank 32A through a pipe 33 and heater 34 which latter discharges into the previously mentioned pipe 6.

The amount of color forming material and rosin discharged from the stripper 28 through the pipe 31 will depend upon the grade of rosin oil undergoing treatment as well as upon the treating conditions, and may, for example, amount to about 10 to 20% of the rosin oil charge.

It will be understood that in practicing the invention the method of flow employed may vary substantially from that illustrated in the drawing. Also the specific type of apparatus employed at any stage in the operation may vary considerably from that indicated above.

For example, the extraction carried out in the extractor 5 may be carried out in a batch operation rather than in continuous flow or it may be carried out in a plurality of stages. Likewise a plurality of extraction towers may be employed.

Again in the case of the separator 23 the separation of the color forming bodies from the solution in water may be effected by scrubbing with the solvent in a countercurrent flow type of operation, although the treatment may be carried out in any other suitable manner.

In operating a tower extractor such as that illustrated in the drawing it is frequently advantageous to maintain a temperature gradient of 30 to 40° F. throughout the tower, the bottom portion of the tower being at the lower temperature. This may be accomplished by introducing the water to the top of the extractor 5 at a somewhat higher temperature than that at which the rosin solution enters from the heater 4. In addition, the temperature conditions throughout the extractor 5 may be controlled to a large extent by the amount of extract recycle or raffinate recycle and the temperature at which the extract or raffinate is recycled to the tower.

While gasoline has been described as a solvent for the solution of the rosin oil charge and also for extracting the color bodies from the water solution, nevertheless it is contemplated that other suitable solvents may be employed for this purpose which are substantially immiscible with water under the conditions prevailing. Other light petroleum distillates may be employed for this purpose. Likewise the solvent may consist essentially of individual petroleum hydrocarbons such as pentane, hexane, heptane, etc. It is preferred to employ a gasoline hydrocarbon which is substantially free from olefinic and aromatic hydrocarbons.

A modification of the invention involves effecting treatment of crude rosin with water under sufficiently elevated temperature and pressure conditions to dissolve the aforesaid impurities and in addition the abietic acid component of the rosin. The resulting solution may then be reduced sufficiently in temperature to effect crystallization of abietic acid from solution while retaining the color bodies and other impurities in solution. The crystallized acid then may be removed in substantially pure form.

Obviously many modifications and variations of the invention as above set forth may be made without departing from the spirit and scope thereof, and therefore only such limitations should be imposed as are indicated by the appended claims.

I claim:

1. A continuous method for refining rosin to remove color bodies therefrom which comprises dissolving rosin in gasoline hydrocarbons, passing a stream of said solution through a heating zone, heating it therein to a temperature of about 300–400° F., then passing the heated stream to the intermediate portion of an extraction column, introducing to the upper portion of the column, in proportion relatively large to said solution stream, a stream consisting of water heated to a temperature of about 300–400° F., subjecting the water and rosin solution to countercurrent contact within the extraction column under a pressure sufficiently elevated to maintain the mixture undergoing treatment in the liquid phase, forming a raffinate phase comprising rosin solution and a minor portion of the water and an extract phase comprising the major portion of the water containing color forming bodies and a minor amount of rosin, separately discharging extract and raffinate phases from the column, substantially reducing the temperature of the discharged extract phase, commingling gasoline hydrocarbons with the discharged extract phase such that color forming bodies are dissolved from the water, separating resulting solution of said bodies in hydrocarbons from water, discharging residual water, stripping hydrocarbon solvent from dissolved extract bodies, discharging stripped solvent, recycling a portion of resulting solvent-free extract bodies to the lower portion of the extraction tower, discharging extract bodies not so recycled, substantially reducing the temperature of the discharged raffinate phase such that water separates from the rosin solution in gasoline hydrocarbons, discharging the rosin solution from which water has been separated, and recycling at least in part the water remaining from both the raffinate and extract phases to the extraction column.

2. A continuous method for refining rosin to remove color bodies therefrom which comprises dissolving rosin in gasoline hydrocarbons, passing a stream of said solution through a heating zone, heating it therein to a temperature of about 300–400° F., then passing the heated stream to the intermedaite portion of an extraction column, introducing to the upper portion of the column, in proportion relatively large to said solution stream, a stream consisting of water heated to a temperature of about 300–400° F., subjecting the water and rosin solution to countercurrent contact within the extraction column under a pressure sufficiently elevated to maintain the mixture undergoing treatment in the liquid phase, forming a raffinate phase comprising rosin solution and a minor portion of the water and an extract phase comprising the major portion of the water containing color forming bodies and a minor amount of rosin, separately discharging extract and raffinate phases from the column, substantially reducing the temperature of the discharged extract phase, commingling gasoline hydrocarbons with the discharged extract phase such that color forming bodies are dissolved from the water, separating resulting solution of said bodies in hydrocarbons from water, discharging residual water, stripping hydrocarbon solvent from dissolved extract bodies, discharging stripped solvent, recycling a portion of resulting solvent-free extract bodies to the lower portion of the extraction tower, discharging extract bodies not so recycled, substantially reducing the temperature of the discharged raffinate phase such that water separates from the rosin solution in gasoline hydrocarbons, discharging the rosin solution from which water has been separated, separating gasoline hydrocarbons from the discharged rosin solution to produce rosin raffinate, recycling a portion of said rosin raffinate to the upper portion of the column and recycling at least a portion of the water remaining from both the raffinate and extract phases to the extraction column.

GEORGE B. ARNOLD.